United States Patent [19]

Lazaridis et al.

[11] 3,948,244

[45] Apr. 6, 1976

[54] VAPOR TRANSFER OVEN

[75] Inventors: Lazaros J. Lazaridis, Lincoln; Edward F. Searight, Harvard, both of Mass.; Paul K. Shefsiek, Farmington, Mich.

[73] Assignee: Thermo Electron Corporation, Waltham, Mass.

[22] Filed: Nov. 20, 1974

[21] Appl. No.: 525,546

Related U.S. Application Data

[60] Division of Ser. No. 333,236, Feb. 16, 1973, Pat. No. 3,853,112, which is a continuation of Ser. No. 165,569, July 23, 1971, abandoned.

[52] U.S. Cl........ 126/19 R; 126/273 R; 126/273.5; 126/337 R
[51] Int. Cl.² .......................................... A21B 1/28
[58] Field of Search......... 126/20, 19, 273 R, 273.5, 126/337 R; 165/105

[56] References Cited
UNITED STATES PATENTS

| | | | |
|---|---|---|---|
| 977,408 | 11/1910 | Kingsland | 126/337 R |
| 1,216,336 | 2/1917 | McBride | 126/20 |
| 2,820,134 | 11/1958 | Kobayashi | 165/105 X |
| 3,603,767 | 9/1971 | Scicchitano | 165/105 X |

Primary Examiner—Edward G. Favors
Attorney, Agent, or Firm—James L. Neal

[57] ABSTRACT

Food preparation apparatus involves a heat transmitting zone and a heat source located remotely from the transmitting zone. Heat energy is transferred from the heat source to the transmitting zone by a fluid vapor which travels from the heat source to the transmitting zone, condenses upon the transmitting zone and then returns in a liquid state to the heat source.

In one described embodiment of this invention, an oven is provided wherein a fluid enclosure within the oven walls confines the vapor which transfers heat energy from a central heat source to heat transmitting surfaces.

13 Claims, 3 Drawing Figures

VAPOR TRANSFER OVEN

CROSS-REFERENCE TO RELATED APPLICATION

This application is a divisional of co-pending U.S. Ser. No. 333,236, filed Feb. 16, 1973 and now U.S. Pat. No. 3,853,112, in the names of Lazaros J. Lazaridis, Edward F. Searight and Paul K. Shefsiek for Vapor Transfer Food Preparation and Heating Apparatus, the aforesaid application Ser. No. 333,236 being a continuation of application Ser. No. 165,569, filed July 23, 1971, now abandoned. A second divisional of U.S. Ser. No. 333,236 entitled Food Preparation Apparatus With Temperature Control is filed of even date herewith in the names of the above inventors.

BACKGROUND OF THE INVENTION

Food preparation apparatus constructed with a view to providing either uniform temperature along a substantial surface area or substantially uniform temperature in several different areas ordinarily involves a plurality of individual heat source elements and a corresponding plurality of temperature control elements, or means to circulate heat by natural or forced convection.

A relatively large cooking surface is typically heated by locating individual heat sources adjacent one side of a thick plate and providing a control element for each heat source. Separate control elements result in apparatus which does not conveniently lend itself to automatic control. Further, the surface or surfaces being heated tend to be characterized by hot spots opposite each heating unit. The tendency to form hot spots may be reduced as a function of increased plate thickness. A relatively thick plate, however, results in an undesirably heavy apparatus which responds slowly to temperature change.

BRIEF SUMMARY OF THE INVENTION

The invention pertains to food preparation apparatus wherein heat is transferred from a heat source to a heat transmitting, or food preparation, surface by a vaporized working fluid. Working fluid is confined in a sealed enclosure which extends from the heat source to the food preparation surface. The working fluid is vaporized at a surface adjacent the heat source and fills the sealed enclosure. It then condenses on a portion of the sealed enclosure adjacent the food preparation surface and releases heat energy.

The food preparation surface may be one which directly applies heat to the food or food containing utensils by conduction, as for example, a cook stove heating unit or a griddle surface, or one which heats an enclosure so as to heat material by convection or radiation, as for example, an oven wherein the transmitting surface forms inner surfaces of the oven. In preferred embodiments, the temperature of the heat transmitting surface is controlled by automatically controlling the amount of heat produced by the heat source.

DETAILED DESCRIPTION OF THE DRAWINGS

Figure 1:
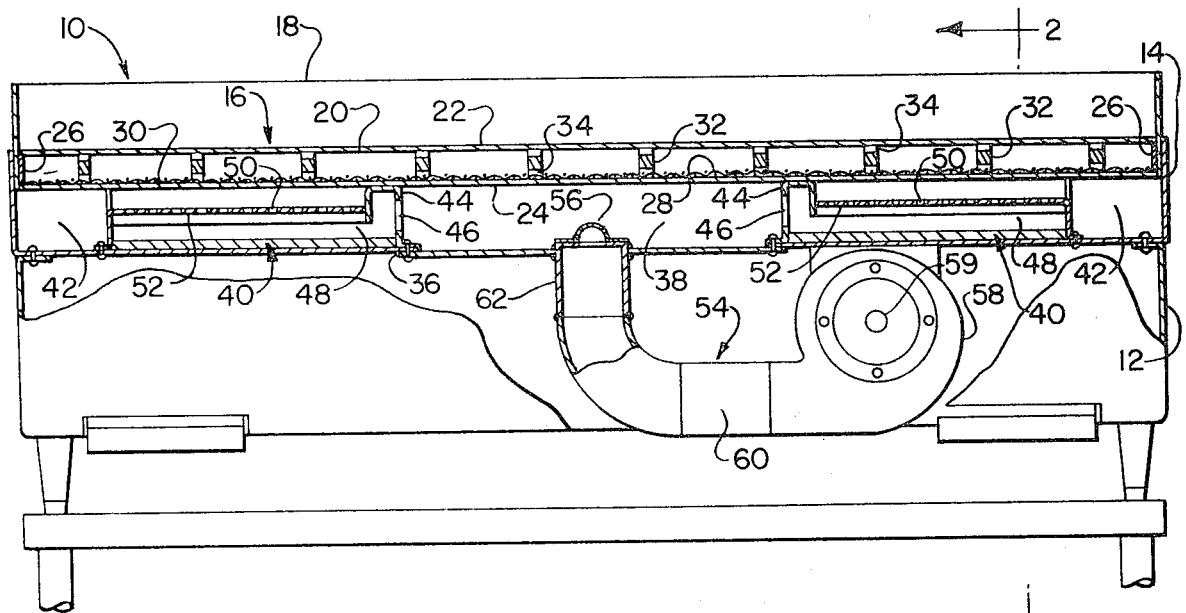
FIG. 1 illustrates one embodiment of the present invention.

FIG. 1 illustrates a griddle 10. The griddle includes a lower housing 12 and an upper housing 14. Supported by upper housing 14 is a splash guard 18 and means 16 forming a cooking surface. The means 16 comprises a casing 20 of plates defining a substantially flat heating surface 22, a heated surface 24, and sides 26, the surface plates 22 and 24 and the sides 26 forming a sealed enclosure. The length and width of the cooking surface, or any other dimension defining the overall dimensional extent of the cooking surface, may be several orders of magnitude greater than the distance between the heating surface plate 22 and the heated surface plate 24. For example, in the apparatus of FIG. 1, the heating surface covers an area of several square feet, typically being 2 to 6 feet long and 2 to 3 feet wide. The distance between the heating and heated surfaces may be approximately 1 inch.

Within the casing 20, a capillary structure 28 covers substantially the entire heated surface 24. The capillary structure may be a woven wire mesh wick. Alternately, the capillary structure may be any porous media capable of withstanding working temperatures of the griddle. Porous sintered material is suitable. The pores may be any size which will sustain capillary action. Pore sizes ranging from 0.001 to 0.200 inch give acceptable results and pore sizes between 0.003 and 0.100 inch are particularly effective in most situations.

A working fluid 30 is sealed within the casing 20 and, when in the liquid state, is distributed over the plate 24 by the capillary structure 28. Supporting members 32 within the casing provide dimensional and volumetric stability thereto. Openings 34 in the supporting members 32 provide free passage for working fluid vapor through and around the support to enable working fluid vapor to be evenly distributed throughout the interior of the casing.

Beneath the upper housing 14, and spaced from the cooking surface means 16 along the upper portion of the lower housing 12 is a partition 36. Centrally along this partition is a combustion chamber 38 on either side of which is located a means 40 forming a jet impingement baffle structure. Along the baffle structures 40, opposite the combustion chamber 38, a pair of exhaust passages 42 extend. The baffle structures 40 each comprise a partition 44 defining passageways 46 for products of combustion. The products of combustion pass from the combustion chamber 38 through the passageway 46 into an enclosed plenum chamber 48 bounded by a surface 52 with exit ports 50 directed toward the heated surface 24. The surface 52 is corrugated and the ports 50 are formed along the portions of the corrugated surface closest to the heating surface 24. The surface corrugation enhances the heat transfer capability of the baffle structure 48 in a manner which will be hereafter described. It should be understood, however, that surface 52 may be of other configurations.

Positioned mainly in the lower housing 12 is a combustion means 54 which includes a flame-supporting surface 56 within the combustion chamber 38. The combustion means 54 comprises a fuel inlet 56, an air inlet 57, a blower 58 with a motor 55, and a passage 60 extending from the blower 58 to a manifold 62. From the manifold 62, a fuel-air mixture is distributed along the flame-supporting surface 56.

Also associated with the griddle 10 is a vent means 64 extending from the rear of the exhaust passages 42. At the front of the griddle, forward of the heating surface 22, is a grease tray 66 equipped with grease drains 68. The grease drains lead to an appropriate receptacle, not shown. At the forward portion of the griddle is an apron 70 to protect the operator of the griddle from the hot parts of the device.

The above described embodiment of this invention operates in this manner. The motor 55 operates the blower 58 to draw fuel, such as natural or other gas, through the inlet 59 and air through the inlet 57. A fuel-air mixture is driven along the passageway 60 into the manifold 62. From the manifold 62, the fuel-air mixture passes to the flame-supporting surface 56 in the combustion chamber 38. Combustion of the fuel within the combustion chamber heats a center section of the heated surface 24 and products of combustion pass from the combustion chamber through passageways 46 into the plenum chamber 48. Products of combustion are directed from the plenum chamber through the ports 50 onto additional portions of the surface 24. Products of combustion passing through the ports 50 are formed into individual jets which impinge forcibly on heated surface 24. Products of combustion then pass to the exhaust passages 42 and finally through the vent 64.

There tends to develop along the surface 24 a boundary layer of fluid which acts as an insulator inhibiting transfer of heat across the surface 24. This boundary layer is interrupted by the jets impinging forcibly upon the surface. Each jet establishes an efficient heat transfer zone absent the boundary layer. The most effective condition prevails when the number of jets is maximized and each jet acts substantially independently of the other jets.

The surface 52 forming the ports 50 is corrugated to permit location of ports 50 closely adjacent the heated surface 24 and to form channels between rows of ports. This construction provides an enlarged volume in the plenum chamber 48 for permitting passage of products of combustion therefrom with minimized interference to the individual jets.

Accordingly, the baffle structures 40 enhance the transfer of heat to the heated surface 24 and thereby increase the overall efficiency of the griddle. The surface 24 could be heated by other methods than that described above, including methods wherein it is heated along a relatively small portion of its surface, even distribution of heat thereover not being essential to even heat distribution at the surface 22.

The heated surface 24 serves as evaporator for liquified working fluids distributed substantially evenly thereover by the capillary structure 28. If a relatively large amount of working fluid is evaporated from one portion of the heated surface plate 24, the capillary structure 28 will draw more fluid to that portion from lesser heated portions. If gravity flow or other pumping action is effective to locate the liquified working fluid adjacent the heat source, the capillary structures may be omitted. Evaporated working fluid fills the casing 20 and condenses upon the heating surface plate 22, thus giving up to the heating surface an amount of heat functionally related to its latent heat of vaporization and the mass of the fluid condensed. Heat transfer by the flow of vapor from the evaporator to the heating surface plate 22, which acts as a condenser, results in a temperature uniformity at the heating surface and quick response of the heating surface to heat energy applied at the heated surface 24.

A working fluid with a high latent heat of vaporization is preferred since temperature uniformity is enhanced by the resulting relatively large quantities of heat which can be transferred to the heating surface with a relatively small mass transfer of working fluid vapor. The desired operating temperature of the heated surface 24 further influences the choice of working fluid. The working fluid may be any fluid which is chemically stable and chemically compatible with the casing 20 and other elements inside thereof and which has physical properties permitting a heat pipe type of operation at the contemplated temperature range. The vapor pressure of the working fluid determines the amount of vapor developed for a given heat input and thereby governs the transfer of energy from the heated surface to the heating surface; the surface tension of the fluid in the liquid state must sustain capillary action in systems where capillary pumping is essential; and a low viscosity enhances return of the condensed working fluid from the heating surface to the heated surface. For relatively low temperatures, water may be used as a working fluid. At intermediate and high temperature ranges, however, undesirably high pressures are encountered when water is used. Practical working fluids at operating temperatures associated with food preparation are hydrocarbon oils and silicon based oils. Examples of suitable products are those marketed by Dow-Corning Corporation of Midland, Mich., and designated Dow-Corning 702, 704 and 705 oils and Dowtherm A which is marketed by Dow Chemical Corporation of Midland, Mich. In the event the apparatus is to be used for purposes other than food preparation at temperature levels above those required for food preparation, potassium and sodium are examples of suitable working fluids.

The interior volume of the casing 20 is substantially evacuated of air and backfilled with the desired amount of working fluid. The system is isothermal, as subsequently explained, and operable over a wide range of temperatures. The system will operate without substantial evacuation, but only non-isothermally and over a reduced temperature range. The amount of working fluid sealed within the casing 20 may vary, but an amount, when in the liquid state, which is sufficient to saturate the capillary structure yields good performance.

The casing 20, its associated capillary structures 28 and working fluid 30, operate in a manner which corresponds to heat pipe theory. The operation is very nearly isothermal with the evaporation and condensation of working fluid taking place at a single working pressure which is constant throughout the interior of the casing. In fact, however, small temperature and pressure gradients exist. The system, though closely approximating constant temperature and constant pressure operation, actually operates in the following manner. As the working fluid vaporizes, the pressure at the surface of evaporation increases. The result is a small pressure differential within the casing 20 between the heated surface 24 and the heating surface 22 which causes vapor to move toward the heating surface 22 where it encounters a temperature lower than the temperature present at the surface of evaporation adjacent the heated surface 24. As a consequence, the vapor liquifies and releases the thermal energy stored in its heat of evaporation. As the fluid condenses, the vapor pressure adjacent the heating surface 22 decreases so that the relatively small pressure differential necessary for continued vapor heat flow is maintained.

The vaporized fluid stores heat energy at the temperature at which the vapor was created and retains the energy at this temperature until it meets a cooler surface. The result is that the temperature across the casing 20 tends to remain constant. The principles involved are essentially those described in the article by T. P. Cotter entitled "Theory of Heat Pipes," Los Alamos Scientific Laboratory, LA–3246–MS, 1965; the article by P. K. Shefsiek and D. M. Ernst entitled "Heat Pipe Development for Thermionic Applications," 4th IECEC Conference, Washington, D. C., 1969; the article by H. Cheung entitled "A Critical Review of Heat Pipe Theory and Applications," University of California, Livermore, Cal., UCRL–50454, July 1968; the article by Feldman, Jr. and Whiting in *Mechanical Engineering* of Feburary 1967 and the article by Eastman in the May 1968 issue of *Scientific American*.

Among the advantages of the griddle described above is its ability of maintaining substantially even heating surface temperatures under all operating conditions and to almost instantly respond to changes in required heat output of the heating surface whether the change in heat output required is over the entire surface or merely over a relatively small section thereof. For example, if the heat output of the entire surface is to be either increased or decreased, a change in the output of the combustion means 54 is almost immediately reflected at the heated surface 22 since there is no large mass between the heating surface and the combustion means to constitute a heat sink. Quick response also occurs when relatively cold cooking utensils or food materials are placed on the heating surface 22. When relatively cold material is placed on the heating surface 22, there is immediately created, within the casing 20, a relatively cool zone adjacent the portion of the heating surface 22 on which the cool material rests. This temperature differential causes an increased amount of vapor to condense at this zone and correspondingly, causes an increase in the amount of heat energy transferred to this zone. It can be appreciated that this results in heat energy being given up at the exact location of greatest need. In addition to quick response, a further increased efficiency of operation is achieved.

Figure 2:
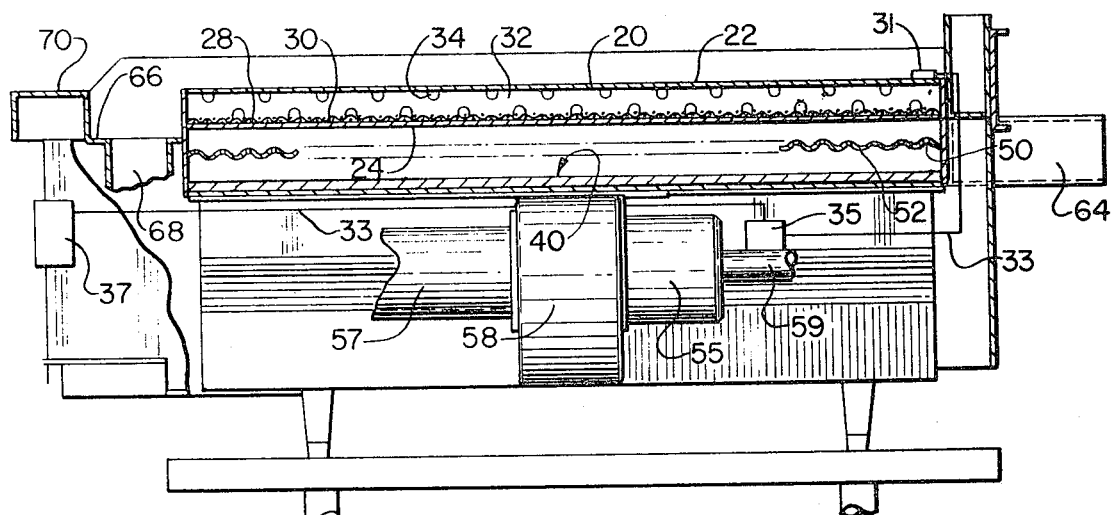
FIG. 2 is a cross-sectional view taken along line 2—2 of FIG. 1.

Cooking apparatus constructed according to this invention requires only a single burner. The output of this burner may be manually controlled to provide a desired temperature level at the heating surface. However, since only a single burner is required, the apparatus lends itself to automatic control of the temperature level at heating surface 22. Any suitable automatic control device may be used. For example, the apparatus shown in FIGS. 1 and 2 may be provided with a solid state thermistor 31 for sensing the temperature of the heating surface 22. The thermistor is connected by an electrical conductor 33 to a solenoid valve 35 which determines the amount of fuel permitted to pass through the fuel inlet 59 to the combustion means 54. A thermostatic control mechanism 37 of conventional construction is provided to enable a desired temperature level to be set. The temperature level of the heating surface 22 is sensed by the thermistor 31 and maintained at the set level by control of the amount of fuel admitted to the combustion means. In one possible alternate, the thermistor, electrical conductor and solenoid valve could be supplanted, respectively, by a liquid filled bulb for sensing temperature level of the heating surface, a capillary line and a mechanical valve connected to the liquid filled bulb by the capillary line for controlling the admission of fuel to the combustion means 54. According to a third alternate, the pressure of the working fluid itself could be used as a temperature sensor by connecting a pressure line between a pressure sensitive fuel metering device to the casing 20.

Figure 3:
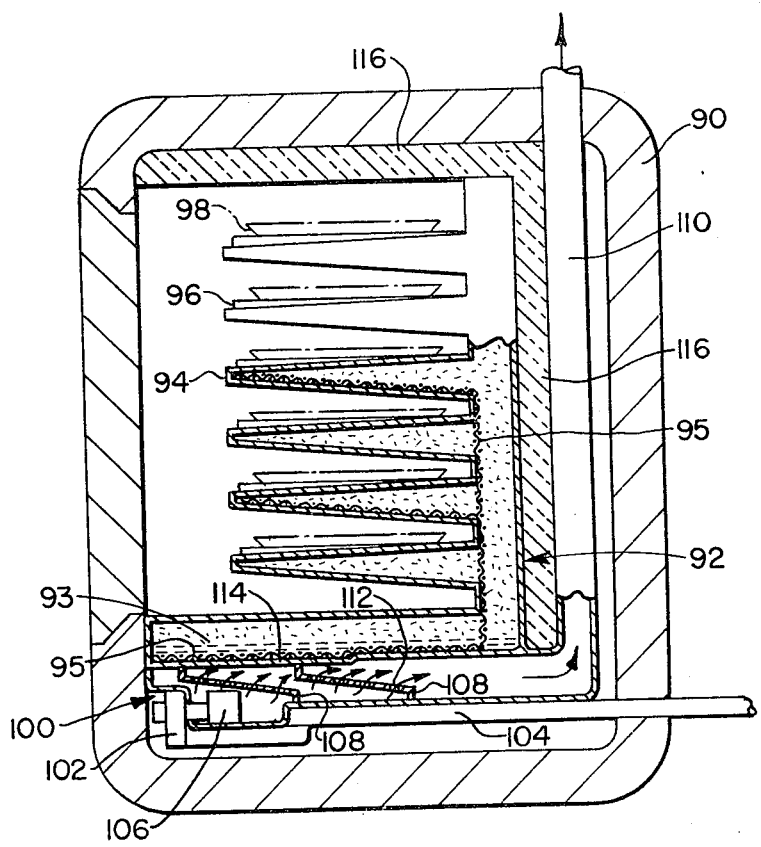
FIG. 3 shows an oven embodying the present invention.

FIG. 3 shows an oven embodying the present invention. The oven walls 90 enclose a casing 92 configured to form shelves. Each shelf 94 is equipped with levelling means 96 on which food materials 98 may rest. Enclosed within the casing 92 is a working fluid 93 and a capillary structure 95. The capillary structure extends over a heated surface 114 for distributing thereover liquified working fluid. The capillary structure 95 may optionally be installed in the shelves 94 of the casing 92. When the capillary structure 95 is installed in the shelves, it serves to draw liquified working fluid from the shelf area down to the heated surface 114. Beneath the casing 92 is a combustion means 100. The combustion means includes a fan 102, an air inlet 104, and burners 106. There is also a baffle means 108 provided with a plurality of ports 112 and an exhaust 110. The fan mixes fuel and air and drives the mixture to the burners. The products of combustion are then driven through the ports 112 in the baffles to form jets which impinge forcibly upon the heated surface 114. Liquified working fluid which is distributed over the surface 114 by the capillary structure 95 is evaporated. Vaporized working fluid is distributed throughout the interior of the casing 92, entering all of the hollow shelves 94, so that the shelf surfaces are heated to thereby heat the interior of the oven and the food utensils 98. Insulation 116 is installed between the top side and back surfaces of the casing 92 and the walls 90 of the oven to prevent excessive heat loss through the walls of the oven. Thermostatic controls like those discussed regarding FIG. 1, may be utilized to govern the oven temperature.

The present invention has been described in reference to particular preferred embodiments. It should be understood that modifications may be made by those skilled in the art without departing from the scope of the invention.

We claim:
1. A food preparation oven comprising:
    a. wall means forming a food preparation compartment;
    b. heat source means external of said food preparation compartment;
    c. working fluid;
    d. means forming a hollow enclosure extending into said food preparation compartment, said enclosure permanently sealing said working fluid therein and forming an evaporator zone for retaining working fluid in the liquid state adjacent said heat source means and a plurality of condenser zones within said food receiving compartment communicating with said evaporator zone through the interior of said enclosure, the walls of said condenser zones providing surfaces upon which vaporized working fluid condenses and transfers thereto its latent heat of vaporization, thereby to provide heat to said food preparation compartments.

2. An oven according to claim 1 wherein said heat source means comprises a fluid fuel burner.

3. A food preparation oven comprising:
    wall means forming a food preparation compartment;

a fluid fuel burner external of said food preparation compartment;

working fluid; and means forming a hollow enclosure extending into said food preparation compartment, said enclosure sealing said working fluid therein and forming an evaporator zone for retaining working fluid in the liquid state adjacent said fluid fuel burner and a plurality of condenser zones within said food receiving compartment communicating with said evaporator zone through the interior of said enclosure, the walls of said condenser zones providing surfaces upon which vaporized working fluid condenses transfers thereto its latent heat of vaporization, thereby to provide heat to said food preparation compartment;

wherein said fluid fuel burner comprises:

means forming a combustion chamber external of said enclosure and said compartment;

means for admitting air and fuel to said combustion chamber to provide thereto a combustible mixture;

baffle means having jet forming perforations therein extending along said evaporator zone closely adjacent thereto for forming a plenum chamber means along the side of said baffle means facing away from said evaporator zone; and means for forcing combustion products from said combustion chamber to said plenum chamber, then through said perforations and onto said evaporator zone as a plurality of discrete jets to thereby heat said evaporator zone and vaporize working fluid in said enclosure.

4. A food preparation oven comprising:
a. insulated wall means forming a food preparation compartment;
b. heat source means adjacent the bottom of said food preparation compartment;
c. working fluid;
d. an evaporator immediately adjacent said heat source means for retaining working fluid in the liquid state;
e. a plurality of hollow shelves arranged within said food preparation compartment for supporting food upon external surfaces thereof; and
f. a passageway extending upward from said evaporator connecting said hollow shelves to each other and to said evaporator in an integral casing to form a single enclosure sealing said working fluid therein and providing fluid communication between said evaporator and the interior of said shelves, the internal surfaces of said shelves providing condensing surfaces upon which vaporized working fluid condenses and transfers thereto its latent heat of vaporization, thereby to provide heat to said food preparation compartment.

5. An oven according to claim 4 further comprising capillary means extending from said shelves to said evaporator.

6. An oven according to claim 4 wherein said heat source means comprises a fluid fuel burner.

7. An oven according to claim 6 wherein said fluid fuel burner comprises:
a. means forming a combustion chamber external of said enclosure and said compartment;
b. means for admitting air and fuel to said combustion chamber to provide thereto a combustible mixture;
c. baffle means having jet forming perforations therein extending along said evaporator closely adjacent thereto for forming a plenum chamber means along the side of said baffle means facing away from said evaporator; and
d. means for forcing combustion products from said combustion chamber to said plenum chamber, then through said perforations and onto said evaporator as a plurality of discrete jets to thereby heat said evaporator and vaporize working fluid in said enclosure, whereby working fluid filling said enclosure condenses internal of said hollow shelves for heating said compartment and food therein.

8. An oven according to claim 6 further comprising means responsive to the temperature level in said oven for controlling the heat output of said heat source means.

9. An oven according to claim 8 wherein said temperature responsive means comprises means sensitive to the pressure internal of said enclosure.

10. An oven comprising:
a. wall means forming a receptacle;
b. a heat pipe forming a condenser section within said receptacle and an evaporator section, said condenser section forming a plurality of hollow shelves for supporting articles; and
c. means for heating said evaporator section to cause working fluid within said heat pipe means to evaporate and be condensed within said hollow shelves upon inner surfaces thereof, whereby heat energy is transferred to the interior of said receptacle.

11. An oven comprising:

wall means forming a receptacle;

a heat pipe forming a condenser section within said receptacle and an evaporator section, said condenser section including a plurality of shelves for supporting articles; and means for heating said evaporator section to cause working fluid within said heat pipe means to evaporate and be condensed within said condenser section, whereby heat energy is transferred to the interior of said receptacle;

wherein said heating means comprises:

means forming a combustion chamber external of said enclosure and said compartment;

means for admitting air and fuel to said combustion chamber to provide thereto a combustible mixture;

baffle means having jet forming perforations therein extending along said evaporator section closely adjacent thereto for forming a plenum chamber means along the side of said baffle means facing away from said evaporator section; and means for forcing combustion products from said combustion chamber to said plenum chamber, then through said perforations and onto said evaporator section as a plurality of discrete jets to thereby heat said evaporator section and vaporize working fluid in said enclosure.

12. An oven according to claim 11 further comprising means responsive to the temperature within said receptacle for controlling said heating means.

13. A food preparation oven according to claim 4 comprising capillary means within said enclosure extending from within said hollow shelves to and over said evaporator for conducting liquid working fluid from said shelves and distributing said working fluid over said evaporator.

* * * * *